(12) United States Patent
Johnson

(10) Patent No.: US 6,398,129 B1
(45) Date of Patent: Jun. 4, 2002

(54) THROAT CONFIGURATION FOR AXISYMMETRIC NOZZLE

(75) Inventor: James Steven Johnson, Shelton, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/472,259

(22) Filed: Dec. 29, 1999

(51) Int. Cl.$^7$ .............................................. B05B 12/00

(52) U.S. Cl. .............................. 239/265.37; 239/265.41

(58) Field of Search ..................... 239/265.41, 265.37, 239/265.39, 265.19

(56) References Cited

U.S. PATENT DOCUMENTS

| 4,440,347 A | | 4/1984 | Madden et al. |
| 4,643,356 A | * | 2/1987 | Holler et al. .................. 239/13 |
| 5,511,376 A | * | 4/1996 | Barcza ........................ 60/230 |

* cited by examiner

*Primary Examiner*—Charles G. Freay
(74) *Attorney, Agent, or Firm*—Norman Friedland

(57) ABSTRACT

The radius of the hinged portion of the convergent/divergent axisymmetrical exhaust nozzle of a gas turbine engine is configured at the surface seeing the flow to be contoured at a critical radius so to enhance the flow characteristics of the nozzle and improve the low observable. The liner normally associated with the convergent flap is cut back at the juncture adjacent the hinged point connecting the divergent flap to be below the radar sight at the tail of the engine.

5 Claims, 2 Drawing Sheets

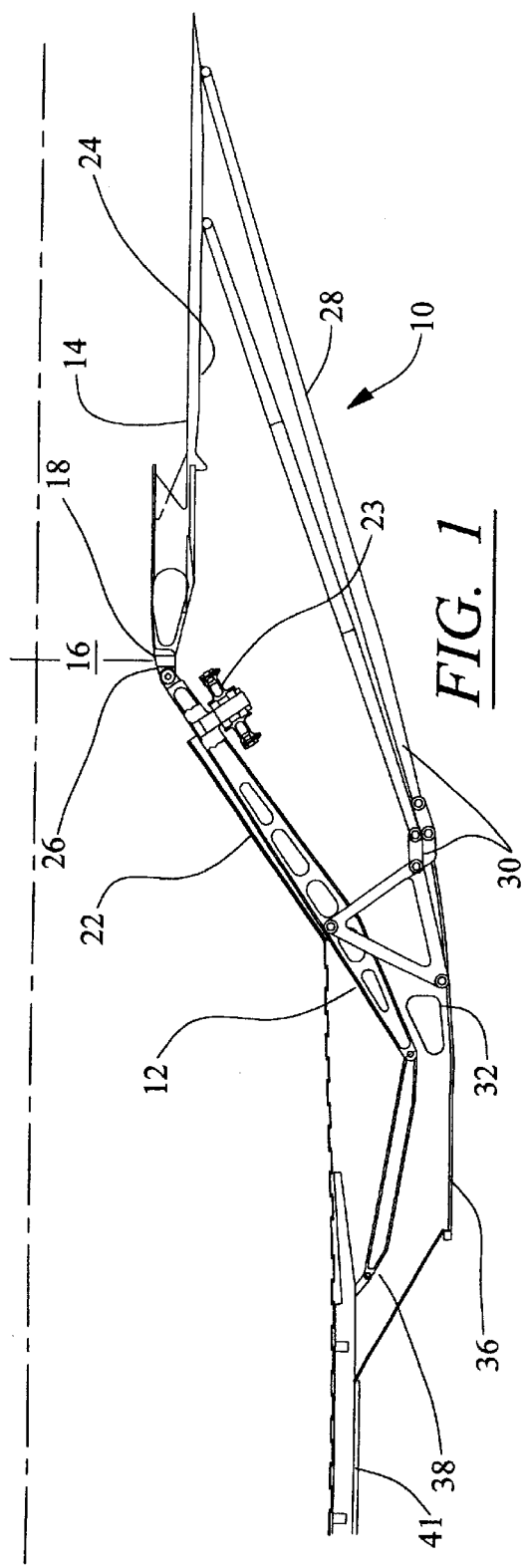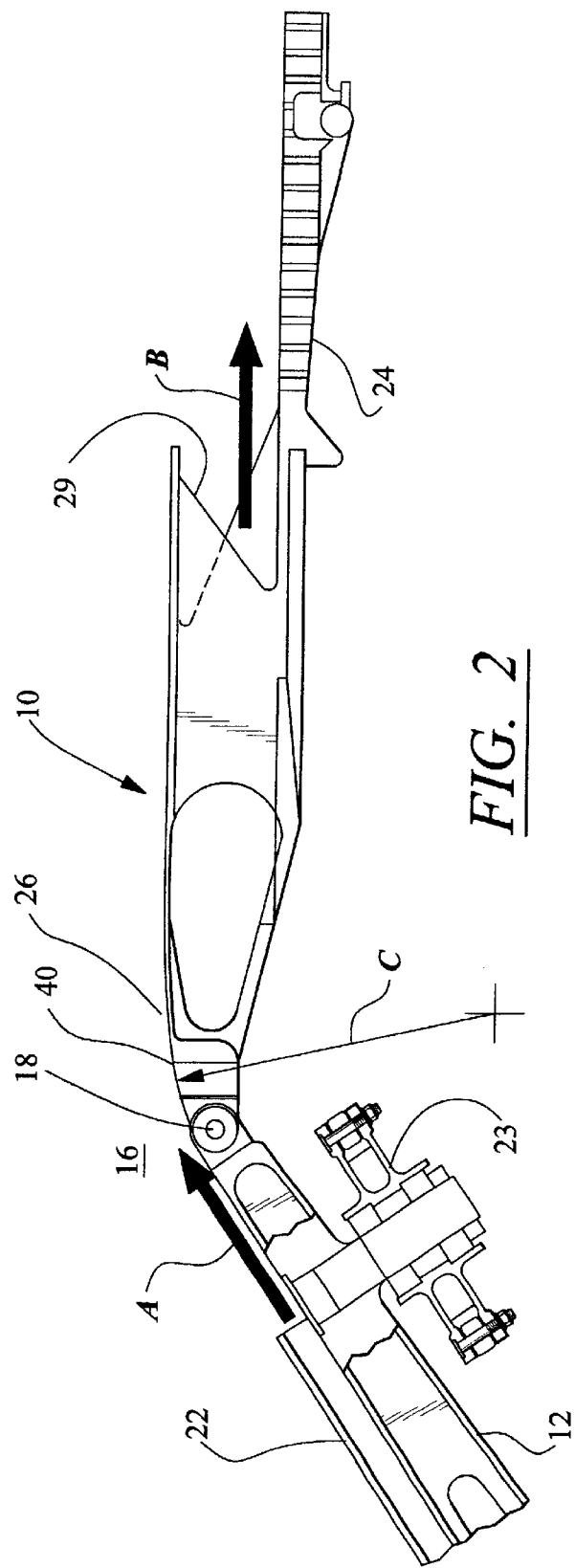

THROAT CONFIGURATION FOR AXISYMMETRIC NOZZLE

TECHNICAL FIELD

This invention relates to the exhaust nozzle of a gas turbine engine for powering aircraft and particularly to the configuration of the throat of a convergent/divergent nozzle of the exhaust of the gas turbine engine.

BACKGROUND OF THE INVENTION

As one skilled in this art will appreciate, the axisymmetrical nozzle of a gas turbine engine serves to adjust the throat of the nozzle so as to be adjusted for different engine operating modes so as to give a different flow characteristics in the throat area. One of the problems with the heretofore known throat is that the interface between the convergent flap portion and divergent flap portion, particularly where the two portions are hinged, not only impairs the flow there over or fails to provide a streamlined flow stream adjacent the boundary layer, it presents itself in the sight of radar and hence, is radar reflective. Where it is desirable to minimize the radar reflectivity of aircraft, particularly, military aircraft, this portion of the axisymmetrical exhaust nozzle present is one of the more significant problems.

I have found that I can provide an improved streamlined flow over the hinged area of the convergent/divergent nozzle of a gas turbine engine designed for military aircraft by changing the hinge configuration. This change in configuration also improves the low observable characteristics of the nozzle. The invention is characterized as being capable of providing these improvements noted in the above, and is characterized as being simple in construction, inexpensive and capable of being used to retrofit existing axisymmetrical nozzles.

SUMMARY OF THE INVENTION

An object of this invention is to provide an improved convergent/divergent nozzle assembly for an axisymmetrical discharge nozzle for a gas turbine engine powering aircraft.

A feature of this invention is to provide a configuration of the flaps adjacent the hinge connection of the convergent and divergent portions of the discharge nozzle that enhance the flow characteristics adjacent thereto and reduce the radar reflectivity and improve the low radar observable.

The foregoing and other features of the present invention will become more apparent from the following description and accompanying drawings.

BRIEF DESCRIPTION OF THE DRAWINGS

FIG. 1 is a fragmentary view in elevation illustrating the convergent and divergent flap of a axisymmetrical nozzle utilizing this invention;

FIG. 2 is an enlarged view illustrating the throat configuration of this invention.

Figure 3:
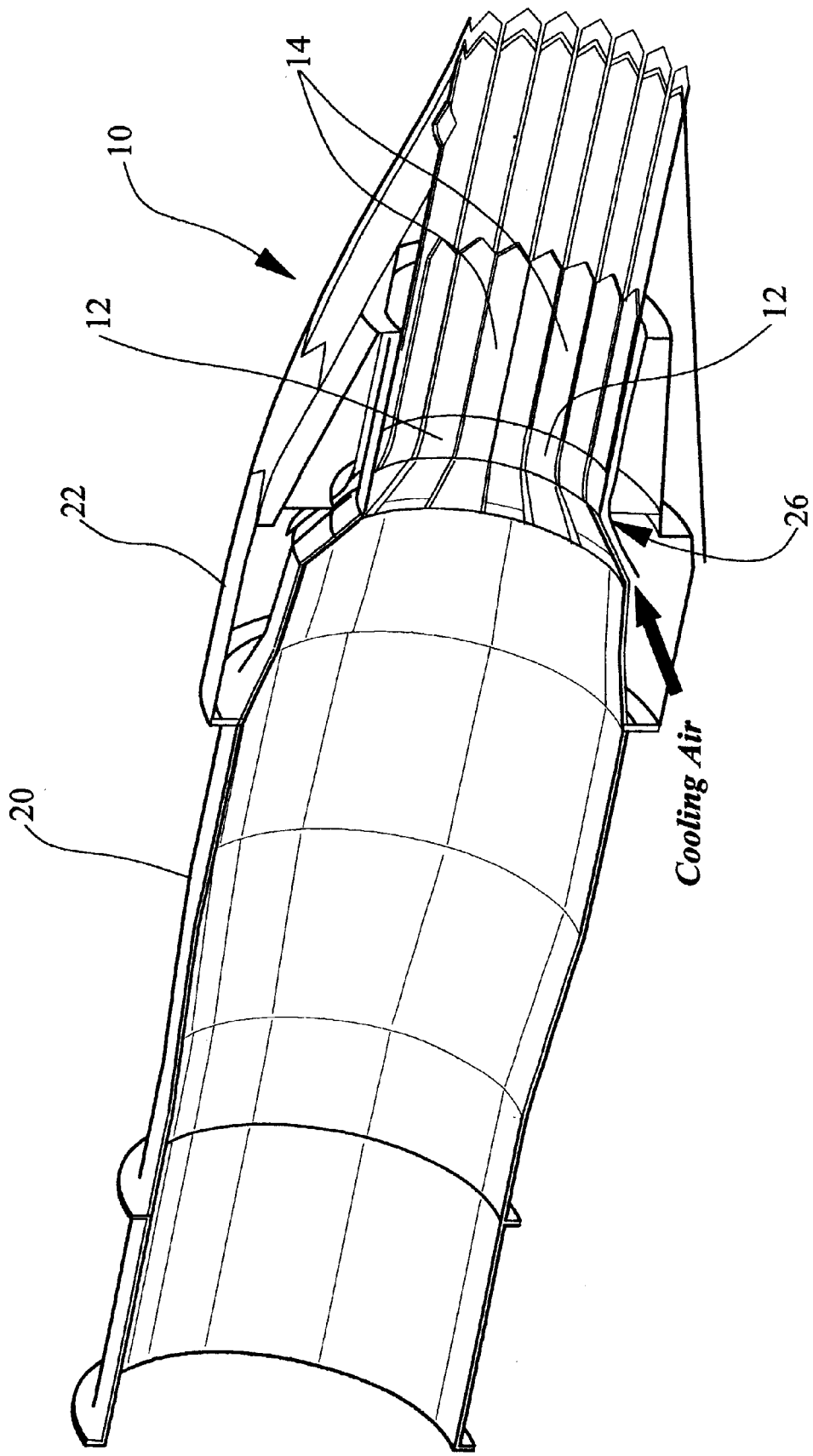
FIG. 3 is a partial view in perspective illustrating this invention in the axisymmetrical exhaust nozzle of a gas turbine engine.

These figures merely serve to further clarify and illustrate the present invention and are not intended to limit the scope thereof.

DETAILED DESCRIPTION OF THE INVENTION

This invention is an improvement over the exhaust nozzle described and claimed in U.S. Pat. No. 4,440,347 granted to Madden et al on Apr. 3, 1984 and commonly assigned to the assignee of this patent application and whose subject matter is incorporated herein by reference.

This invention can best be understood by referring to FIGS. 1–3 which shows the portion of the convergent/divergent nozzle generally illustrated as reference numeral 10 as having a plurality of circumferentially spaced axially extending convergent flaps 12 and a similar number of circumferentially spaced axially extending divergent flaps 14 that are hingedly connected at the throat 16 by the hinge 18. These flaps 14 and 12 are articulated in a well known manner in order to change the throat area of the throat 16.

The convergent/divergent flaps are suitably mounted in the transition duct 20 which interconnects with the afterburner (not shown) which in turn interconnects with the main engine. As is typical in the axisymmetrical exhaust nozzle the transition duct and convergent flap incorporate liner 22 to transport the heat away from the main components of the nozzle. The divergent flap 14 likewise is provided with a suitable liner 24. Also, typical in this construction is the use of cooling air as depicted by the arrows A and B taken from the compressor (not shown) which flows over the the components intended to be cooled and discharged from an ejector 29. Articulation of the convergent/divergent flaps to change the throat area is suitably effectuated by the bellcrank lever 23 which pivots flaps 12 and 14 about the hinge 18 to adjust the throat 16 at the radius throat 26. The external flaps 28 consisting of a plurality of circumferentially spaced axial flap member is attached to the mode strut and bracket assembly 30 and articulate with the movement of the convergent/divergent flaps. A unison ring 32, similar to the unison ring depicted in U.S. Pat. No. 4,440,347 is similarly used to move all of the individual flap elements synchronously. A balancing flap 36, that is also a plurality of circumferentially spaced axial flap elements serves to minimize the load on the actuation members. The dogbone link 38 attached to the static structure 41 supports the convergent/divergent assembly through the static structure 41 that, in turn, is grounded to the transition duct.

Since the structural details of the axisymmetrical nozzle are well known a detailed description thereof is omitted here from for the sake of simplicity and for a more detailed description reference should be made to U.S. Pat. No. 4,440,347, supra. Suffice it to say that the convergent/divergent flaps serve to adjust the throat area (defined by the radius C) of the exhaust nozzle to provide the desired flow characteristics during certain operating conditions within the engine's operation envelope. The invention can best be seen in FIG. 2 where the liner 22 is cut back from the hinge 18 and the surface 40 adjacent the hinge 18 defines a smooth transition portion of the divergent flap and creates a smooth transition relative to the radius throat 26. In accordance with this invention the range of radii of surface 40 or radius throat 26, at this location is between 2 inches (") to 10" and preferably being at 7". This configuration of the radius throat 26 is critical and is applied to all the visible surfaces of the nozzle throat including, as required, the flaps and the seals adjacent to the flaps which serve to prevent the hot gases of the engine to escape and bypass the exhaust nozzle. By adhering to the critical radius as described above the radius throat 26 when articulated remains on a station line (a vertical plane passing through each location of the engine and nozzle) of the nozzle so that it does not alter the basic kinematics of the nozzle while providing a smooth transition for the radar energy and at the same time enhancing the aerodynamic performance of the nozzle.

What has been shown by this invention is a radius throat adapted for use on a well known axisymmetrical nozzle throat which serves to reduce the radial reflectivity characteristics of the nozzle while collaterally improving the the aerodynamic performance of the nozzle. This invention has been tested and found to reduce the radar reflectivity from the typical axial station line throat design approach by three (3) to four (4) orders of magnitude.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A convergent/divergent nozzle of an axisymmetrical exhaust nozzle for a gas turbine engine including a hinged pivot at the juncture of where the convergent portion and the divergent portion of said nozzle meet, said convergent nozzle comprising a plurality of circumferentially spaced axially extending flaps and said divergent nozzle having a plurality of circumferentially spaced axially extending flaps, a radius throat having a surface exposed to the working medium of the gas turbine engine and being located at the juncture of the hinged pivot, the surface of said radius throat being defined by a convex curvature formed on the flaps of the divergent nozzle and falling in the range of from 2 inch radius to 10 inch radius.

2. A convergent/divergent nozzle of an axisymmetrical exhaust nozzle for a gas turbine engine as claimed in claim 1 wherein said radius is substantially equal to 7.0 inches.

3. A convergent/divergent nozzle of an axisymmetrical exhaust nozzle for a gas turbine engine including a hinged pivot at the juncture of convergent portion and the divergent portion of said nozzle, said convergent nozzle comprising a plurality of circumferentially spaced axially extending flaps and said divergent nozzle having a plurality of circumferentially spaced axially extending flaps, a radius throat at the juncture of the hinged pivot, said radius throat movable through a range of radial positions and exposed to the working fluid of the gas turbine engine, a liner attached to the surface of said convergent flaps exposed to the engine's working fluid for dissipating heat away from said convergent flaps, said liner extending along the length of said convergent flaps and terminating short of said hinged pivot and falling below the high point of said curvature and being out of the line of sight from the tail of the gas turbine engine at all radial positions of said radius throat.

4. A convergent/divergent nozzle of an axisymmetrical exhaust nozzle for a gas turbine engine as claimed in claim 3 wherein the radius of said radius throat being defined by a curvature formed on the flaps of the divergent nozzle and falling in the range of from 2 inch radius to 10 inch radius.

5. A convergent/divergent nozzle of an axisymmetrical exhaust nozzle for a gas turbine engine as claimed in claim 4 wherein said radius is substantially equal to 7.0 inches.

* * * * *